(12) United States Patent  (10) Patent No.: US 7,376,244 B2
Baer  (45) Date of Patent: May 20, 2008

(54) IMAGING SURVEILLANCE SYSTEM AND METHOD FOR EVENT DETECTION IN LOW ILLUMINATION

(75) Inventor: Richard L. Baer, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 827 days.

(21) Appl. No.: 10/720,411

(22) Filed: Nov. 24, 2003

(65) Prior Publication Data

US 2005/0111696 A1  May 26, 2005

(51) Int. Cl.
*G06K 9/00* (2006.01)
(52) U.S. Cl. ...................................... 382/103
(58) Field of Classification Search ...................... None
See application file for complete search history.

(56) References Cited

U.S. PATENT DOCUMENTS 5,486,810 A    1/1996  Schwarz
5,909,244 A *  6/1999  Waxman et al. .......... 348/222.1
6,081,606 A *  6/2000  Hansen et al. .............. 382/107
6,082,894 A    7/2000  Batko et al.
7,193,652 B2 * 3/2007  Hori et al. ................... 348/362
2001/0046310 A1* 11/2001 Shima ......................... 382/107
2004/0086152 A1* 5/2004  Kakarala et al. ............ 382/103

\* cited by examiner

*Primary Examiner*—Matthew C. Bella
*Assistant Examiner*—Alex Liew
(74) *Attorney, Agent, or Firm*—RatnerPrestia

(57) ABSTRACT

A surveillance system and method is provided for detecting and event and then capturing an image of the event under low illumination conditions. A camera captures a current image and a prior reference image under low illumination conditions using a long exposure time and compares the current and reference images to determine whether an event has occurred in the current image. An illumination source is activated upon the detection of an event to provide artificial illumination. The illumination allows an additional event image to be captured using a shorter exposure time.

20 Claims, 2 Drawing Sheets

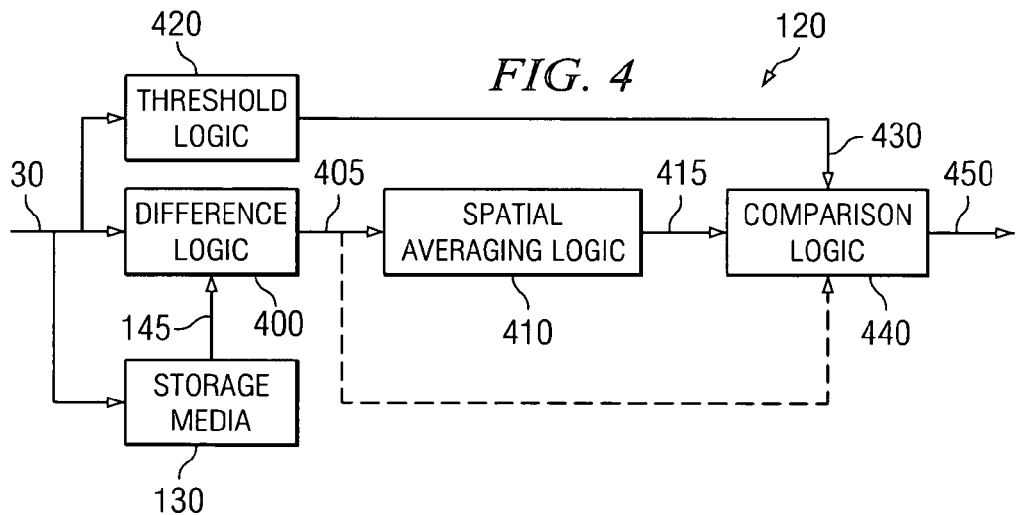
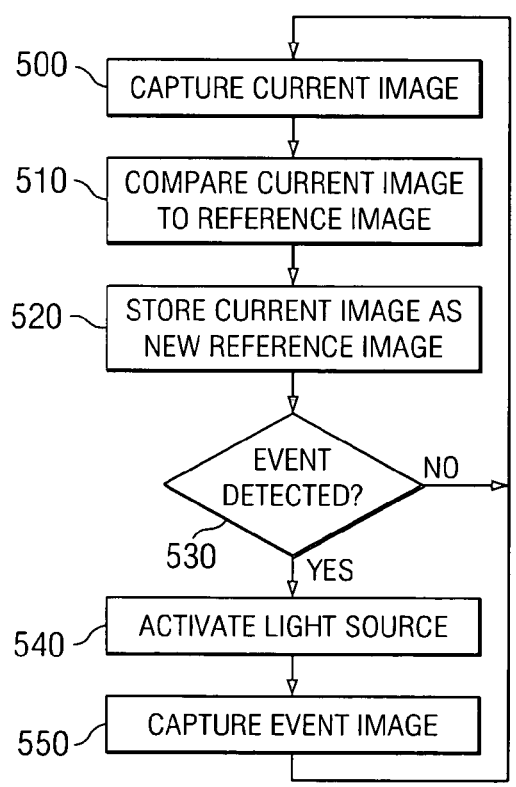
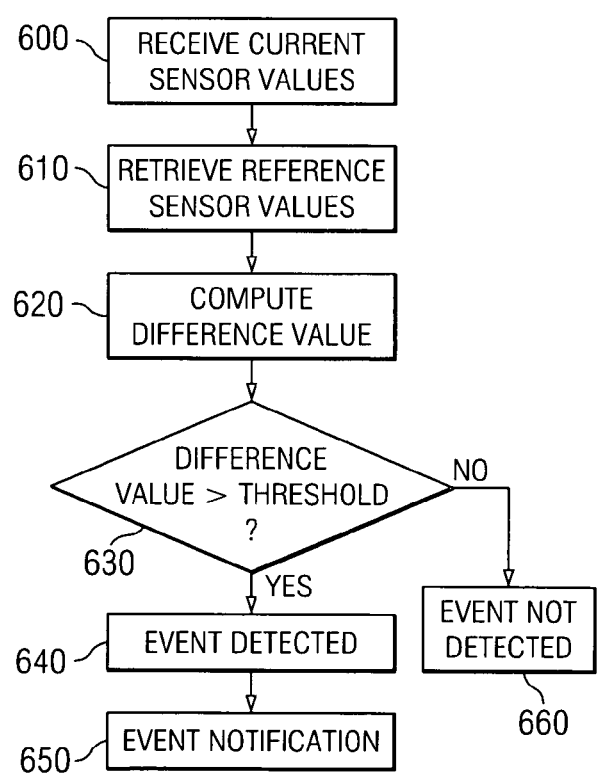

IMAGING SURVEILLANCE SYSTEM AND METHOD FOR EVENT DETECTION IN LOW ILLUMINATION

BACKGROUND OF THE INVENTION

1. Technical Field of the Invention

The present invention relates generally to surveillance systems, and specifically to event detection using images captured by surveillance systems.

2. Description of Related Art

Surveillance systems commonly employ video cameras to monitor facilities. Historically, these cameras have transmitted analog video images of an area under surveillance to a security monitoring center for inspection and storage. In many facilities, analog video cameras are being replaced with digital cameras that detect and capture still images of events, such as the appearance of an intruder, a malfunction, or a fire within the area under surveillance. Digital cameras provide several advantages over analog video cameras. For example, digital cameras can be radio linked and battery powered to eliminate the need for the costly fixed infrastructure of video cables and power lines, making surveillance systems cheaper and easier to deploy.

However, digital cameras have limited sensitivity, and in areas of low illumination or at night, a source of artificial illumination is required. In commercial applications, lights can be left on at night in order to illuminate the facilities that must be secured. However, in residential applications, lights that are left on at night can be disturbing to both the occupants of a property and their neighbors. In addition, if a illumination source is attached to a battery-powered camera, constant illumination would reduce the life of the battery, necessitating frequent battery replacements. Therefore, what is needed is a surveillance system capable of operating under low illumination conditions.

SUMMARY OF THE INVENTION

Embodiments of the present invention provide a surveillance system and method for detecting an event and capturing an image of the event under low illumination conditions. A camera is configured to capture a current image under low illumination conditions (e.g., between one centilux and one lux) and to compare the current image to a reference image previously captured under substantially similar low illumination conditions. The camera is further configured to determine, based on the results of the comparison, whether an event has occurred in the current image. The current image and reference image are captured using long exposure times (e.g., up to six seconds) in order to enable the camera to receive sufficient light in the low illumination conditions.

In one embodiment, an illumination source is connected to the camera and activated upon the detection of an event to provide sufficient artificial illumination to capture one or more additional event images using a shorter exposure time (e.g., up to 1/60 of a second). The event image(s) can be stored internally within the camera or transmitted to an external security system for storage and/or analysis.

In another embodiment, one or more thresholds are used to measure the change between the current and reference images required for an event to be detected. For example, a difference value representing the difference between selected sensor values of the current image and selected sensor values of the stored reference are compared to a threshold. If the difference value exceeds the threshold, an event is detected.

Advantageously, embodiments of the present invention enable a surveillance camera to operate under low illumination conditions without consuming excessive power. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 4 is a block diagram illustrating exemplary logic for implementing an event detection module for use under low illumination conditions, in accordance with embodiments of the present invention;

FIG. 5 is a flow chart illustrating an exemplary process for capturing an image of an event under low illumination conditions, in accordance with embodiments of the present invention; and FIG. 6 is a flow chart illustrating an exemplary process for detecting an event under low illumination conditions, in accordance with embodiments of the present invention.

DETAILED DESCRIPTION OF EXEMPLARY EMBODIMENTS

The numerous innovative teachings of the present application will be described with particular reference to exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
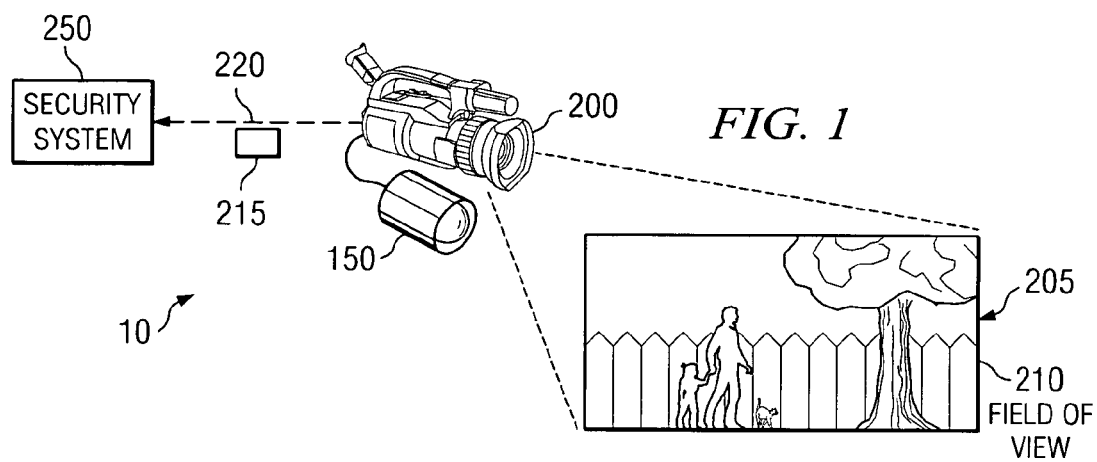
FIG. 1 is a simplified overview of a surveillance system.

FIG. 1 illustrates a surveillance system 10 capable of operating under low illumination conditions, in accordance with embodiments of the present invention. The surveillance system 10 uses a camera 200, such as a digital camera, or other type of imaging sensor device to monitor the activity of targets in a scene 205 by capturing one or more images of the scene 205. The scene 205 that the surveillance system 10 monitors depends on a field-of-view 210 of the camera 200, which is determined, at least in part, by the type of lens that the camera 200 employs. For example, the lens can be a wide angle lens, capturing about a 60 degree field-of-view, or a regular lens, capturing about a 45 degree field-of-view.

In embodiments of the invention, the camera 200 is capable of capturing an image under low illumination conditions, such as an image of a nighttime scene 205 with little or no artificial illumination. For example, the illumination level within a low illumination image can be between one centilux and one lux. Although low illumination images can be used to detect the occurrence of events, such as the appearance of an intruder, the resolution of images taken under low illumination conditions may be insufficient to adequately analyze the event because of motion blur. Therefore, a visible or infrared illumination source 150, such as a strobe light, is attached to the camera 200 or directly or wirelessly connected to the camera 200 (as shown) to provide temporary artificial illumination when an event occurs. For example, the illumination source 150 can be attached to a building, and activated by the camera 200 via a switch or wireless connection to a switch upon the detection of an event.

The camera 200 is further capable of storing data 215 related to the captured image of the event for later use or retrieval. In other embodiments, the camera 200 is configured to transmit the data 215 to a security system 250 via a link 220 between the camera 200 and the security system 250. For example, the data 215 can include the whole event image or only a portion of the event image. The link 220 can include any transmission medium, such as coaxial cable, fiber optic link, twisted wire pair, air interface, satellite link or direct interface between the camera 200 and security system 250. The security system 250 can be physically located in a separate facility from the camera 200 or within the same facility as the camera 200, depending upon the particular application.

The security system 250 can be anything from a simple data storage device to a security monitoring center. For example, the monitoring center can include a computer capable of processing the data 215, displaying a picture in response to the data and producing a report related to the data. The computer can be a personal computer, server or other type of programmable processing device. In other embodiments, the security system 250 can include an e-mail alert or other signaling method (e.g., paging) that is sent from the security system to a designated party.

Figure 2:
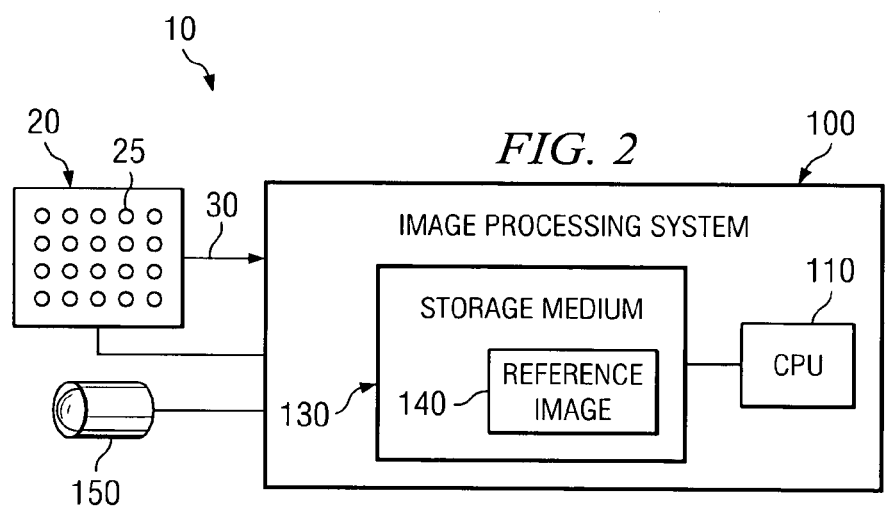
FIG. 2 is a block diagram illustrating components of the surveillance system.

Referring now to FIG. 2, various components of the surveillance system 10 are illustrated. The surveillance system 10 includes an image sensor 20, such as a CMOS sensor chip or a CCD sensor chip within the camera 200 (shown in FIG. 1). The sensor 20 includes a two-dimensional array of pixels 25 arranged in rows and columns. In one embodiment, the image sensor 20 is a black and white sensor. However, in another embodiment, the image sensor 20 is a color sensor.

The image sensor 20 is connected to provide raw sensor values 30 representing a current image to an image processing system 100. A storage medium 130 within the image processing system 100 stores a reference image 140 for comparison with the current image. In accordance with embodiments of the present invention, the reference image 140 includes sensor values representing a prior image taken under substantially similar illumination conditions as the current image. The storage medium 130 can be any type of memory device, such as a dynamic random access (DRAM) memory.

A Central Processing Unit (CPU) 110 within the image processing system 100 controls the receipt of the current sensor values 30 and compares the current sensor values 30 to the stored reference sensor values 140 to determine whether an event has occurred. Upon the detection of an event, the CPU 110 further activates an illumination source 150 to provide sufficient artificial illumination to capture one or more additional high quality images of the event. The CPU 110 can be any microprocessor or microcontroller configured to load and/or run software associated with the event detection module 120 and access the storage medium 130.

Figure 3:
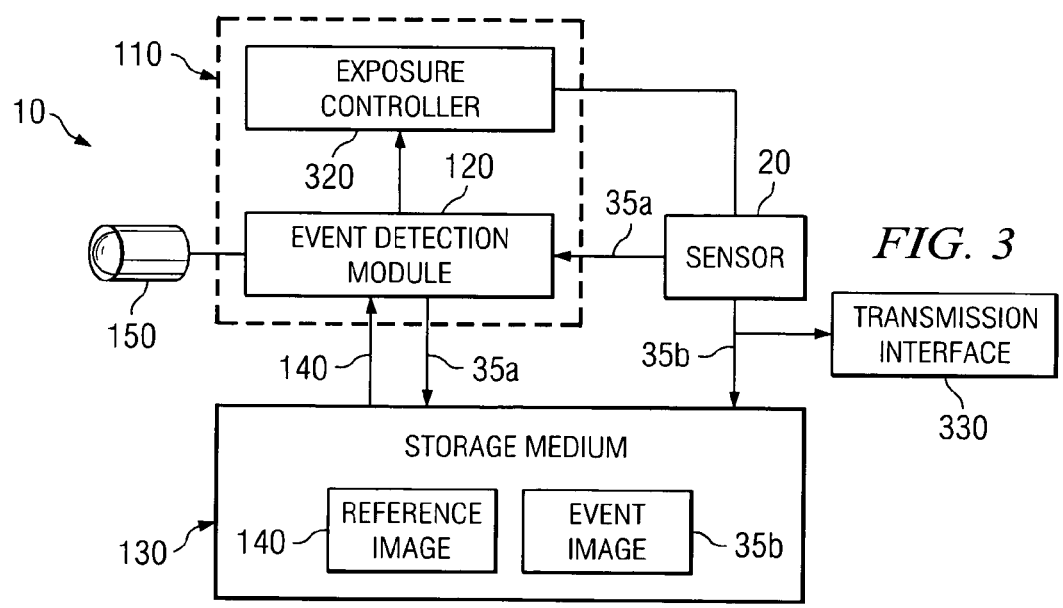
FIG. 3 is a block diagram illustrating the operation of the surveillance system under low illumination conditions, in accordance with embodiments of the present invention.

The operation of the surveillance system 10 under low illumination conditions is shown in FIG. 3. Under low illumination conditions (e.g., between one centilux and one lux), the sensor 20 captures a current image 35*a* using a long exposure time (e.g., up to approximately six seconds) and transmits sensor values representing the current image 35*a* to an event detection module 120 of the CPU 110. The exposure time is controlled by an exposure controller 320 that sets the photodiode integration time for each of the pixels in the sensor 20. With a long exposure time, the temporal resolution of moving objects within the captured image deteriorates due to image blurring resulting from the motion. However, the temporal resolution is sufficient to detect the occurrence of motion relative to a reference image 140 taken prior to the current image 35*a*.

To detect an event, the reference image 140 is retrieved from the storage medium 130 and input to the event detection module 120 when the current image 35*a* is provided to the event detection module 120. In one embodiment, the stored reference image 140 includes sensor values representing a prior full digital image. In another embodiment, the reference image 140 is a set of statistics summarizing a prior digital image. When using a prior full image as a stored reference image 140, event detection may be based on either ratios or differences of sensor values with the current image 35*a*. For example, as described in Durucan and Ebrahimi, "Change Detection and Background Extraction by Linear Algebra," *Proceedings of the IEEE*, Vol. 89, No. 10, pp. 1368-1381 (2001), which is hereby incorporated by reference, a change between the current image and a reference image is detected based on a vector model of the current image compared to the vector model of the reference image.

Once an event is detected, the event detection module 120 activates the illumination source 150, instructs the exposure controller 320 to reduce the exposure time and instructs the sensor 20 to take one or more subsequent event images 35*b*. As used herein, the term even image 35*b* includes one or more images. Under artificial illumination from the illumination source 150, the sensor 20 captures the event image 35*b* using a short exposure time (e.g., up to 1/60 of a second). The sensor values representing the event image 35*b* can be stored directly in the storage medium 130 or compressed and stored in the storage medium 130. The storage medium 130 used to store the event image 35*b* can be the same type of memory device used to store the reference image 140 or a different type of memory device, such as a compact flash or flash memory. In other embodiments, the event image 35*b* or other data related to the event image 35*b* is transmitted via a transmission interface 330 to an external security system for analysis and/or and storage. The transmission interface 330 provides an external interface to a wired or wireless connection to the external security system.

Once the event image 35*b* are captured, the event detection module 120 deactivates the illumination source 150 and accesses the exposure controller 320 to return the exposure time to a long exposure time (e.g., up to six seconds). Activating the illumination source 150 only when an event is detected minimizes power consumption and preserves battery life.

The operation of the event detection module 120 in accordance with one embodiment of the present invention is shown in FIG. 4. The event detection module 120 is applied to the current sensor values 30 representing the current image 35*a* (shown in FIG. 3) taken under low illumination conditions to determine whether an event has occurred in the current image. To detect an event, difference logic 400 retrieves reference sensor values 145 representing the reference image 140 (shown in FIG. 3) from the storage medium 130 and determines difference sensor values 405 that represent differences between the current sensor values 30 and reference sensor values 145. For example, in one embodiment, the difference sensor values 405 are determined by subtracting the reference sensor values 145 from the current sensor values 30 on a pixel-by-pixel basis., Subtracting the reference sensor values 145 from the current sensor values 30 removes scene elements and dark current that are common to the reference and current images. In another embodiment, the difference sensor values 405 are determined by calculating ratios between the current sensor values 30 and the reference sensor values 145. It should further be understood that in the context of FIG. 4, and as used elsewhere below, the term "logic" refers to the hardware, software and/or firmware capable of performing the function of the logic.

In one embodiment, the difference sensor values 405 are provided directly to comparison logic 440 to determine whether an event has occurred, as described in more detail below. In another embodiment, the difference sensor values 405 are first applied to spatial averaging logic 410 to calculate a difference value 415 determined by summing a certain number of the difference sensor values 405 and dividing by the number of summed difference sensor values 405. Averaging the difference sensor values 405 not only simplifies the analysis process, but also improves the discrimination between the signal component and the noise component within each of the sensor values, since the noise component typically varies from pixel to pixel.

The number of difference sensor values 405 used to determine the difference value 415 depends on the type of sensor used, the exposure times of the sensor, the type of event being detected, and other factors. The particular difference sensor values 405 used to determine the difference value 415 depends on the areas of interest in the scene, the areas in the scene having known changes that may skew the results, the identification of defective pixels and other factors.

The difference value 415 can be a single value or multiple values representing the average change within a spatial area of the current image. For example, the sensor values can be divided into blocks or regions of interest and a difference value can be computed for each block. When dividing the image into blocks, event detection can occur based on a change within a single block or changes over a number of blocks.

The difference value 415 is applied to comparison logic 440 to determine whether the difference value 415 exceeds a threshold 430 provided by threshold logic 420. In one embodiment, the threshold 430 is a single threshold for comparison with a single difference value 415. In another embodiment, the threshold 430 includes multiple thresholds for comparison with multiple difference values 415. For example, if a separate difference value is computed for two or more blocks of pixels, an individual block threshold can be used to determine whether a particular block in the current image has changed significantly from the corresponding block in the reference image and a total block threshold can be used to determine whether the number of changed blocks indicates an event.

In another example in which the difference sensor values 405 are applied directly to the comparison logic 440, the threshold 430 includes two thresholds, an individual pixel threshold and a total pixel threshold. The individual pixel threshold is used to determine whether a particular pixel in the current image has changed significantly from the corresponding pixel in the reference image. The total pixel threshold is used to determine whether the total number of changed pixels indicates an event. The total pixel threshold can be applied to all pixel locations or only a portion of the pixel locations. For example, the total pixel threshold can indicate the number of pixels in an area or region of interest in the scene that need to change or the number of contiguous pixels in the largest contiguous collection of pixels that need to change to indicate an event.

The threshold 430 for determining whether the change in the current image is significant enough to indicate an event can be preset for all images or computed based on the sensor values 30 of the current image. Thus, in some embodiments, the threshold 430 is set during the manufacturing process, by an operator of the surveillance system or using a table of values for the threshold 430 based on sensor values 30, etc.

In other embodiments, the threshold 430 is fixed or preconfigured based on the image sensor being used.

The comparison logic 440 outputs an event result 450 whose state indicates whether an event has occurred in the current image. If the event result 450 signifies that an event has been detected, the event detection module 120 activates the illumination source and one or more high quality images are collected using a short exposure time (e.g., up to 1/60 of a second). Otherwise, the current image is stored as the reference image and the event detection module 120 receives another long exposure image for comparison with the reference image.

An exemplary process for capturing an image of an event under low illumination conditions is shown in FIG. 5. To detect an event, the camera captures a current image under low illumination conditions using a long exposure time (block 500). The current image is compared to a stored reference image taken under substantially similar illumination conditions prior to the current image (block 510). Thereafter, the stored reference image is updated with the current image for a subsequent comparison with a new image (block 520).

Based on the comparison between the current image and the previously stored reference image, a determination is made whether an event has occurred (block 530). If an event is detected in the current image (block 530), an illumination source is activated (block 540) to provide sufficient artificial illumination to capture one or more high quality images of the event using a short exposure time (block 550). Execution then returns to block 500. If the result of the comparison indicates an event has not occurred in the current image (block 530), a new long exposure image is captured (block 500) and compared with the stored reference image (block 510), which now corresponds to the immediately preceding current image.

An exemplary process for detecting an event within a current image (block 530) is shown in FIG. 6. Upon receiving the sensor values for the current image (block 600), reference sensor values corresponding to a previous image are retrieved (block 610) for comparison with the current sensor values. A difference value between the current sensor values and the reference sensor values is calculated (block 620) for use in determining whether a change has occurred in the current image compared with the previous image.

If the difference value exceeds a threshold (block 630), an event is detected in the current image (block 640). Upon the detection of an event, an event notification is transmitted to indicate that an event has occurred (block 650). If the difference value does not exceed the threshold (block 630), no event is detected (block 660).

The innovative concepts described in the present application can be modified and varied over a wide range of applications. Accordingly, the scope of patented subject matter should not be limited to any of the specific exemplary teachings discussed, but is instead defined by the following claims.

I claim:

1. A surveillance system for detecting an event, comprising:
   a sensor for capturing a current image using a first exposure time to produce sensor values representing said current image and capturing an event image using a second exposure time; and
   an image processing system for performing a comparison of at least a portion of said sensor values representing said current image and spatially corresponding sensor values of a stored reference image captured using said first exposure time, said image processing system further for detecting said event in said current image based upon said comparison and instructing said sensor to capture said event image using the second exposure time;

wherein the first and second exposure times are, respectively, first and second time periods for exposing an array of pixels to capture a respective image to produce sensor values, the second exposure time is less than the first exposure time, and the respective image captured by the first exposure time includes several consecutive first image frames and the respective image captured by the second exposure time includes several consecutive second image frames and the first image frames are captured entirely during the first time period and the second image frames are captured entirely during the second time period.

2. The surveillance system of claim 1, wherein said image processing system is configured to perform said comparison by computing a difference value between at least a portion of sensor values representing said current image and spatially corresponding sensor values representing said reference image.

3. The surveillance system of claim 2, wherein said image processing system is further configured to perform said comparison by determining whether said difference value exceeds a threshold, said image processing system being configured to detect said event when said difference value exceeds said threshold.

4. The surveillance system of claim 1, wherein said image processing system is further configured to replace said reference image with said current image.

5. The surveillance system of claim 1, further comprising:
an illumination source connected to said image processing system and operable in response thereto to provide artificial illumination during the capture of said event image.

6. The surveillance system of claim 1, wherein said first exposure time is up to six seconds, and said second exposure time is up to 1/60 of a second.

7. The surveillance system of claim 1, further comprising:
a storage medium for storing said event image.

8. The surveillance system of claim 1, further comprising:
a transmission interface for transmitting said event image to an external security system.

9. The surveillance system of claim 1, wherein said reference image and said current image are captured under an illumination level between one centilux and one lux.

10. A method for performing event detection within a surveillance system, the method comprising:
comparing a current image with a reference image, said current image and said reference image being captured using a first exposure time;
detecting an event based upon said comparing; and
capturing an event image using a second exposure time;
wherein the first and second exposure times are, respectively, first and second time periods for exposing an array of pixels to capture a respective image to produce sensor values,
the second exposure time is less than the first exposure time, and
the respective image captured by the first exposure time includes several consecutive first image frames and the respective image captured by the second exposure time includes several consecutive second image frames and
the first image frames are captured entirely during the first time period and the second image frames are captured entirely during the second time period.

11. The method of claim 10, wherein said comparing further comprises:
computing a difference value between at least a portion of sensor values representing said current image and spatially corresponding sensor values representing said reference image.

12. The method of claim 11, wherein said comparison further comprises:
determining whether said difference value exceeds a threshold, said event being detected when said difference value exceeds said threshold.

13. The method of claim 10, further comprising:
storing said current image as said reference image.

14. The method of claim 10, further comprising:
in response to said detecting, providing artificial illumination during said capturing.

15. The method of claim 10, further comprising:
transmitting said event image to an external security system.

16. The method of claim 15, further comprising:
transmitting said event image over a wireless connection to said external security system.

17. A method for capturing an image of an event by a surveillance system, the method comprising:
comparing a current image with a reference image, said current image and said reference image being captured using a first exposure time;
detecting an event based upon said comparing;
in response to said detecting, providing artificial illumination; and
capturing an event image under the artificial illumination using a second exposure time,
wherein the first and second exposure times are, respectively, first and second time periods for exposing an array of pixels to capture a respective image to produce sensor values,
the second exposure time is less than the first exposure time, and
the respective image captured by the first exposure time includes several consecutive first image frames and the respective image captured by the second exposure time includes several consecutive second image frames and
the first image frames are captured entirely during the first time period and the second image frames are captured entirely during the second time period.

18. The method of claim 17, wherein said comparing further comprises:
computing a difference value between at least a portion of sensor values representing said current image and spatially corresponding sensor values representing said reference image.

19. The method of claim 18, wherein said comparison further comprises:
determining whether said difference value exceeds a threshold, said event being detected when said difference value exceeds said threshold.

20. The method of claim 17, further comprising:
capturing said reference image and said current image under an illumination level between one centilux and one lux.

* * * * *

UNITED STATES PATENT AND TRADEMARK OFFICE
CERTIFICATE OF CORRECTION

| | |
|---|---|
| PATENT NO. | : 7,376,244 B2 |
| APPLICATION NO. | : 10/720411 |
| DATED | : May 20, 2008 |
| INVENTOR(S) | : Baer |

Page 1 of 1

It is certified that error appears in the above-identified patent and that said Letters Patent is hereby corrected as shown below:

On the face page, in field (57), under "Abstract", in column 2, line 2, delete "and" and insert -- an --, therefor.

In column 8, line 35, in Claim 17, delete "," and insert -- ; --, therefor.

Signed and Sealed this

Twenty-sixth Day of August, 2008

JON W. DUDAS
*Director of the United States Patent and Trademark Office*